United States Patent
Taylor

(10) Patent No.: US 8,734,637 B2
(45) Date of Patent: May 27, 2014

(54) METHOD OF SCAVENGING HYDROGEN SULFIDE AND/OR MERCAPTANS USING TRIAZINES

(75) Inventor: Grahame N. Taylor, Jersey Village, TX (US)

(73) Assignee: Baker Hughes Incorporated, Houston, TX (US)

( * ) Notice: Subject to any disclaimer, the term of this patent is extended or adjusted under 35 U.S.C. 154(b) by 835 days.

(21) Appl. No.: 12/723,434

(22) Filed: Mar. 12, 2010

(65) Prior Publication Data

US 2011/0220551 A1 Sep. 15, 2011

(51) Int. Cl.
*C10G 17/00* (2006.01)

(52) U.S. Cl.
USPC .................................... 208/208 R

(58) Field of Classification Search
USPC .............................. 208/236, 208 R; 423/220
See application file for complete search history.

(56) References Cited

U.S. PATENT DOCUMENTS

| | | | |
|---|---|---|---|
| 4,978,512 A * | 12/1990 | Dillon | 423/226 |
| 5,128,049 A | 7/1992 | Gatlin | |
| 5,462,721 A * | 10/1995 | Pounds et al. | 423/226 |
| 5,674,377 A * | 10/1997 | Sullivan et al. | 208/208 R |
| 6,063,346 A | 5/2000 | Luna | |
| 7,264,786 B2 | 9/2007 | Pakulski et al. | |
| 7,438,877 B2 * | 10/2008 | Salma et al. | 423/220 |
| 2003/0089641 A1 * | 5/2003 | Gatlin | 208/207 |
| 2003/0198585 A1 | 10/2003 | Salma et al. | |
| 2008/0056974 A1 * | 3/2008 | Salma et al. | 423/243.01 |

FOREIGN PATENT DOCUMENTS

EP 0636675 A2 2/1995

OTHER PUBLICATIONS http://chemicalland21.com/industrialchem/organic/ AMINOETHYLETHANOLAMINE.htm ,(Jan. 15, 2010) , 3.*

* cited by examiner

*Primary Examiner* — Prem C Singh
*Assistant Examiner* — Jaun Valencia
(74) *Attorney, Agent, or Firm* — John Wilson Jones; Jones & Smith, LLP

(57) ABSTRACT

Sulfhydryl compounds, including hydrogen sulfide and mercaptans, may be removed from a fluid or gaseous stream or substrate by reacting the hydrogen sulfide and mercaptans in the stream with a scavenger of the structural formula:

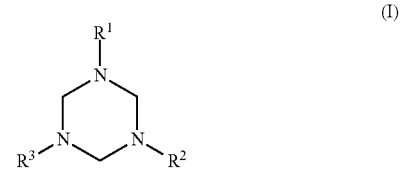

(I)

wherein $R^1$, $R^2$ and $R^3$ are each independently selected from the group consisting of $R^4$ and $R^5$, $R^4$ is a $C_1$-$C_{20}$ straight or branched chain alkyl group, $R^5$ is —$[(CH)_m—NH]_p$—$(CH_2)_nOH$, n and m are independently an integer from 2 to about 6, p is from 1 to about 6; and wherein at least one of $R^1$, $R^2$ and $R^3$ is $R^4$ and at least one of $R^1$, $R^2$ and $R^3$ is $R^5$.

20 Claims, 1 Drawing Sheet

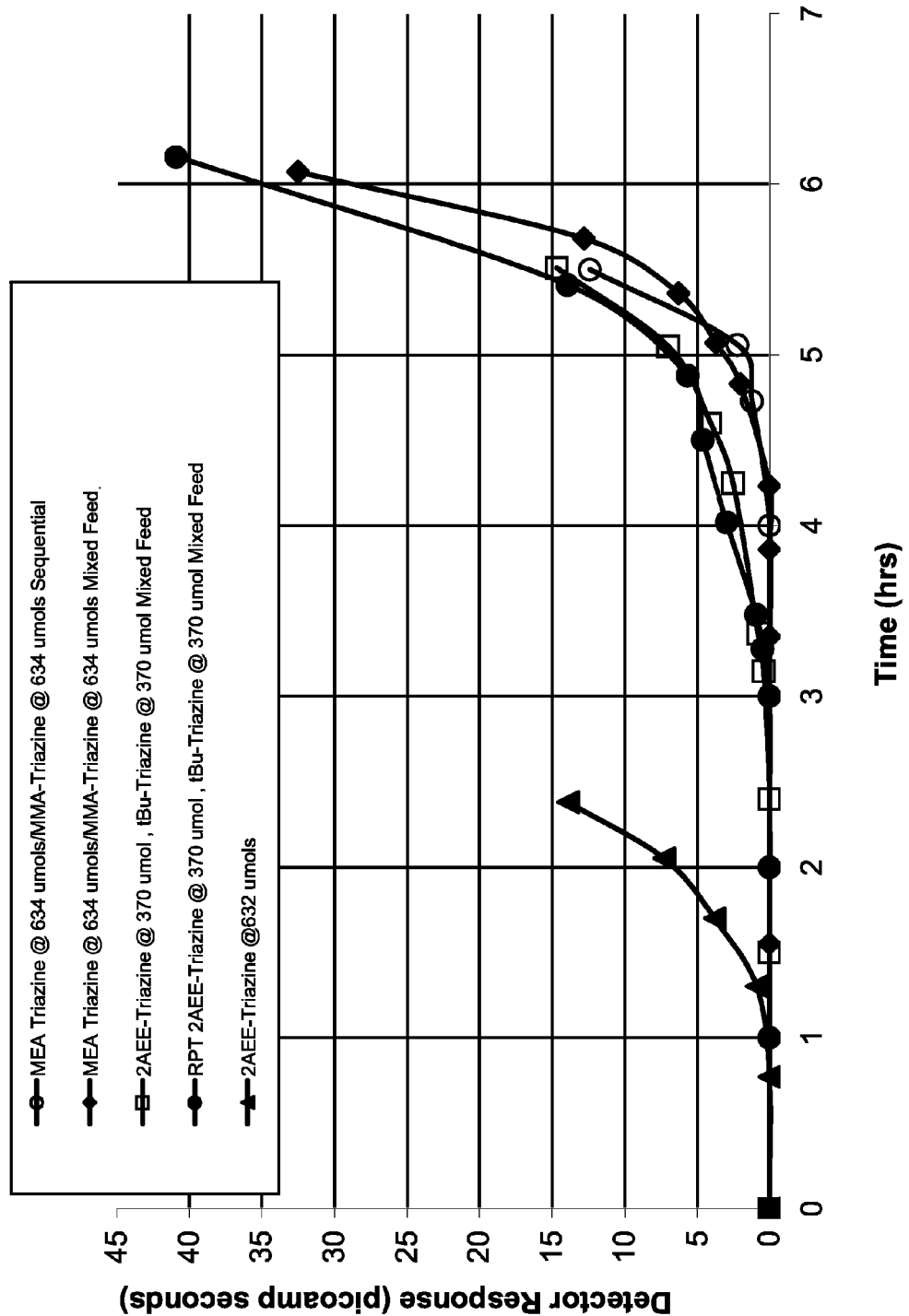

METHOD OF SCAVENGING HYDROGEN SULFIDE AND/OR MERCAPTANS USING TRIAZINES

FIELD OF THE INVENTION

Hydrogen sulfide, mercaptans and other sulfhydryl compounds may be removed from a fluid stream by contacting the stream with a triazine hydrogen scavenger.

BACKGROUND OF THE INVENTION

In the drilling, production, transport, storage, and processing of crude oil, including waste water associated with crude oil production, and in the storage of residual fuel oil, hydrogen sulfide and mercaptans are often encountered. The presence of hydrogen sulfide and mercaptans is objectionable because they often react with other hydrocarbons or fuel system components. Further, hydrogen sulfide and mercaptans are often highly corrosive as well as emit highly noxious odors. Uncontrolled emissions of hydrogen sulfide gives rise to severe health hazards. Burning of such vapors neither solves toxic gas problems nor is economical since light hydrocarbons have significant value.

Furthermore, hydrogen sulfide and mercaptans, as well as other sulfhydryl compounds, are often present in the underground water removed with the crude oil, in the crude oil itself and in the gases associated with such water and oil. When the water and oil are separated from each other, they emit foul odors. For instance, hydrogen sulfide is emitted as a gas which is associated with water and hydrocarbon vapors. Natural gases further often contain sulfhydryl compounds.

Treatments for removal of sulfhydryl compounds, such as hydrogen sulfide and mercaptans, from hydrocarbons and other substrates include the use of various reactive organic compounds. For example, U.S. Pat. No. 6,063,346 discloses the use of a combination of maleimides, formaldehydes, amines, carboxamides, alkylcarboxyl-azo compounds and cumine-peroxide compounds for the removal of hydrogen sulfide and mercaptan contaminants from a fluid. Further, U.S. Pat. No. 5,128,049 discloses the use of certain morpholino and amino derivatives for the removal of hydrogen sulfide content from fluids. In addition, U.S. Pat. No. 6,063,346 and U.S. Pat. No. 5,128,049 disclose the use of triazines to remove hydrogen sulfide.

There is a continuing need for alternatives which may be useful in the removal and/or reduction of hydrogen sulfide and other sulfhydryl compounds from aqueous and hydrocarbon substrates. Such alternatives include the development of new scavengers which are quick acting and which exhibit high affinity for removing sulfhydryl compounds.

SUMMARY OF THE INVENTION

Hydrogen sulfide, mercaptans and other sulfhydryl compounds may be removed from aqueous and hydrocarbon substrates by contacting the substrate with an effective amount of a scavenger containing hydrophobic as well as hydrophilic groups. The scavenger includes those of the formula:

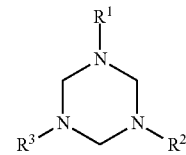

(I)

wherein $R^1$, $R^2$ and $R^3$ are each independently selected from the group consisting of $R^4$ and $R^5$, $R^4$ is a $C_1$-$C_{20}$ straight or branched chain alkyl group, $R^5$ is —$[(CH)_m$—$NH]_p$—$(CH_2)_n OH$, n and m are independently an integer from 2 to about 6, p is from 1 to about 6; and wherein at least one of $R^1$, $R^2$ and $R^3$ is $R^4$ and at least one of $R^1$, $R^2$ and $R^3$ is $R^5$. In preferred embodiments, p is 1, n and m are 2 and/or $R^4$ is a $C_1$-$C_6$ straight or branched chain alkyl group, more preferably $R^4$ is t-butyl. In a preferred embodiment, $R^5$ is —$CH_2CH_2NHCH_2CH_2OH$.

BRIEF DESCRIPTION OF THE DRAWINGS

In order to more fully understand the drawings referred to in the detailed description of the present invention, a brief description of each drawing is presented, in which:

FIG. 1 depicts the scavenging efficacy of the triazine defined herein.

DETAILED DESCRIPTION OF THE PREFERRED EMBODIMENTS

In the present invention, an aqueous or hydrocarbon substrate is brought into contact with a hydrogen sulfide scavenger which has both hydrophobic and hydrophilic groups. As used herein, the term "hydrogen sulfide scavenger" shall include those scavengers useful in the treatment of aqueous and hydrocarbon substrates that are rendered "sour" by the presence of sulfhydryl compounds. The term shall include, in addition to hydrogen sulfide and mercaptans, thiols, thiol carboxylic acids and dithio acids as well as other sulfhydryl compounds. As used herein, the term "aqueous substrate" refers to any "sour" aqueous substrate, including waste water streams in transit to or from municipal waste water treatment facilities, tanning facilities, and the like. The term "hydrocarbon substrate" is meant to include unrefined and refined hydrocarbon products, including natural gas, derived from petroleum or from the liquefaction of coal, both of which contain hydrogen sulfide or other sulfur-containing compounds. Thus, particularly for petroleum-based fuels, the term "hydrocarbon substrate" includes, but is not limited to, wellhead condensate as well as crude oil which may be contained in storage facilities at the producing field. "Hydrocarbon substrate" also includes the same materials transported from those facilities by barges, pipelines, tankers, or trucks to refinery storage tanks, or, alternately, transported directly from the producing facilities through pipelines to the refinery storage tanks. The term "hydrocarbon substrate" also includes refined products, interim and final, produced in a refinery, including distillates such as gasolines, distillate fuels, oils, and residual fuels and to vapors produced by the foregoing materials.

The invention defined herein is therefore applicable to a wide variety of fluid streams, including liquefied petroleum gas as well as crude oil and petroleum residual fuel, heating oil, etc. In addition, the invention is applicable to gaseous hydrocarbon streams. For instance, the scavenger may be contacted with wet or dry gaseous mixtures of hydrogen sulfide and/or mercaptan and hydrocarbon vapors, such as is found, for instance, in natural gas or obtained in the drilling, removal from the ground, storage, transport, and processing of crude oil.

The hydrogen sulfide scavenger useful in the present invention may include those of the formula:

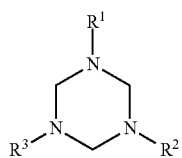
(I)

wherein $R^1$, $R^2$ and $R^3$ are each independently selected from the group consisting of $R^4$ and $R^5$, wherein $R^4$ is a hydrophobic group and $R^5$ is a hydrophilic group.

In a preferred embodiment, $R^4$ is a $C_1$-$C_{20}$ straight or branched chain alkyl group, $R^5$ is $-[(CH)_m-NH]_p-(CH_2)_nOH$, n and m are independently an integer from 2 to about 6, p is from 1 to about 6; and wherein at least one of $R^1$, $R^2$ and $R^3$ is $R^4$ and at least one of $R^1$, $R^2$ and $R^3$ is $R^5$. In preferred embodiments, p is 1, n and m are 2 and/or $R^4$ is a $C_1$-$C_6$ straight branched chain alkyl group, more preferably $R^4$ is t-butyl. In a more preferred embodiment, $R^5$ is $-CH_2CH_2NHCH_2CH_2OH$.

The triazines of formula (I) exhibit a high uptake capacity for hydrogen sulfide and other sulfhydryl compounds, and the raw materials required to manufacture the triazines are relatively low cost materials.

The scavengers are formed by reacting at least one alkanolamine and at least one primary alkyl amine with an aldehyde. The following multifunctional amine products are produced, for example:

(i) a first triazine of formula (I) wherein $R^1$ and $R^2$ are $R^4$ and $R^3$ is $R^5$;

(ii) a second triazine of formula (I) wherein $R^1$ is $R^4$ and $R^2$ and $R^3$ are $R^5$;

(iii) a third triazine of formula (I) wherein $R^1$, $R^2$ and $R^3$ are $R^4$; and (iv) a fourth triazine of formula (I) wherein $R^1$, $R^2$ and $R^3$ are $R^5$ provided the substituent for $R^4$ for each of the triazines of (i), (ii), (iii) and (iv) is the same and the substituent for $R^5$ for each of the triazines of (i), (ii), (iii) and (iv) is the same.

For instance, the scavenger formed from the reaction of formaldehyde 2-aminoethylethanolamine (as alkylalkanol amine) and t-butylamine (as primary alkyl amine) will produce the following mixture of triazines:

(a)

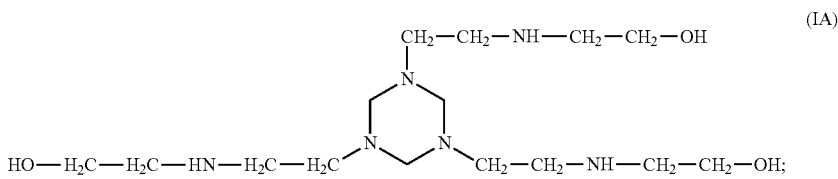 [SMILES: OCCNCCN1CN(CCNCCO)CN(CCNCCO)C1]
(IA)

(b)

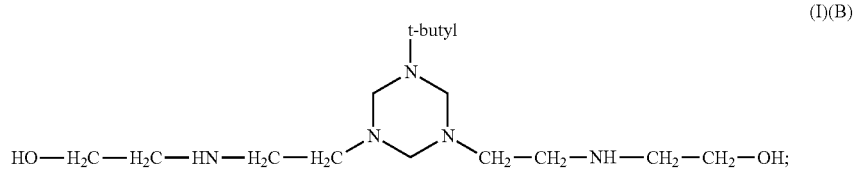
(I)(B)

(c)

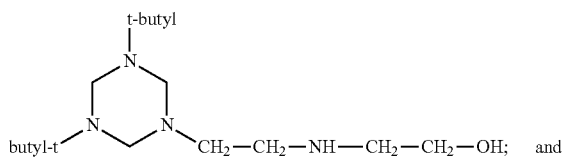
(I)(C)

(d)

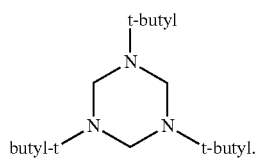
(I)(D)

Typically, the molar ratio of formaldehyde to total amines ranges from about 2:1 to about 1:2. Alternatively, the molar ratios of formaldehyde to total amines may range from about 1.5:1 up to about 1:1.5. In another embodiment, the molar ratios of formaldehyde to total amines may range from about 1.15:1 to 1:1.15. The molar ratio of the primary alkyl amine to alkanolamine may range from about 99:1 to about 1:99; alternatively from about 90:10 to about 10:90, and more often from about 75:25 to about 25:75. Generally, the reaction is an exothermic one, thus the evolved heat should be controlled such as by removing heat, adding the components at a controlled, slow rate, etc.

The scavenger may be added to any aqueous or nonaqueous medium containing hydrogen sulfide, mercaptan or other sulfhydryl compound where the amount of hydrogen sulfide is sought to be reduced. Wet gaseous mediums are those containing water vapors and/or hydrocarbon vapors. Thus, the method of present invention is useful in controlling hydrogen sulfide and/or mercaptans in water systems, oil and gas production and storage systems, and other similar systems.

Generally, for industrial or commercial use, the scavenger may be contacted with a stream containing the hydrogen sulfide, mercaptans or other sulfhydryl compounds for removal. Contact can occur in a variety of containers, such as a process or transport line, a separate stirred or non-stirred container or other vessels such as scrubbers or strippers. Further, the scavenger may be atomized and introduced as a gas to be contacted with another fluid. Alternatively, solid or stabilized liquid scavenger may be sprayed or added into a system. Further, a solution can be added via surface or downhole equipment or at any time in the process stream in recovering crude oil so as to remove the noxious quality and corrosive nature of the hydrogen sulfide and mercaptans in the processing system.

The scavengers may be added neat or diluted with water or solvent and may be formulated or blended with other suitable materials or additives. It is preferred that the scavenger be introduced to the hydrocarbon stream as a homogeneous mixture. Where water is present, the scavenger is selected so that the reaction product of scavenger and hydrogen sulfide and/or mercaptan is preferably soluble both in water and in the feedstream. For liquid systems, suitable solvents for dissolving the scavenger include polar and non-polar solvents such as water, alcohols, esters, benzene and benzene derivates. The preferred solvents include water, ethyl acetate, acetone, kerosene, aromatic naphtha, benzene, toluene and xylene.

In general, the hydrogen sulfide and/or mercaptan scavenger in the method of the present invention is injected into or otherwise brought into intimate contact with the liquid hydrocarbon, hydrogen sulfide and/or mercaptan and, when present, water and/or solvent in any convenient manner. With emissions from a residual fuel oil, the scavenger may be stirred into the fuel oil. When used with a natural gas, the natural gas may be scrubbed with an aqueous or nonaqueous solution of the scavenger. Additionally, when the natural gas, as it often does, contains water vapors, the scavenger may be injected into a stream of the gas moving within a conduit. In such case, when the water vapors are removed from the natural gas as a liquid, the product of the hydrogen sulfide and/or mercaptan and scavenger will also be removed. The scavenger can further be used in scavenging hydrogen sulfide and/or mercaptans from recovered substances obtained form subterranean wells.

The amount of the scavenger used in accordance with the present invention will depend on the amount of the hydrogen sulfide and/or mercaptan in the medium being treated. In general, the amount of the scavenger added to the medium is at least an effective scavenging amount, for example, from about 20 ppm to about 2,000 ppm or more, preferably from about 40 to about 1,200 ppm, and more preferably from about 100 to about 400 ppm of hydrogen sulfide and/or mercaptan.

In general, it is desirous to conduct the process in temperatures at between from about 40 to about 150° C., preferably between from about 85 to about 120° C.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

All percentages set forth in the Examples are given in terms of weight units except as may otherwise be indicated.

EXAMPLES

Example 1

Synthesis of 1,3,5-tris(N-(2-hydroxyethyl)-2-aminoethyl)hexahydro-s-triazine (2AEE-TRZ)

Water and formaldehyde (18.5 g, 0.62 moles) were added to a reaction flask. The flask was then cooled with an ice bath. 2-Aminoethylethanolamine (67.34 g, 0.64 moles) was added dropwise and a strong exothermic reaction was observed. The temperature was controlled to not exceed 50 C. After complete addition, the reaction mixture was stirred for a further 3 hours to ensure complete reaction. (This reaction could be carried out with either 37% aqueous formalin or paraformaldehyde as the source of formaldehyde.) The resulting product had the structural formula:

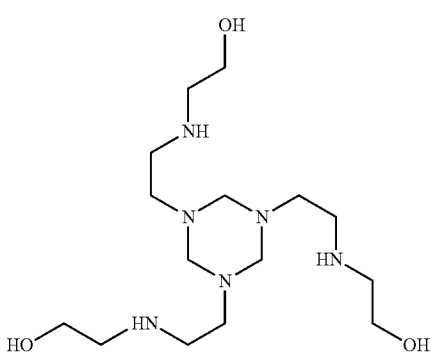 [SMILES: OCCNCCN1CN(CCNCCO)CN(CCNCCO)C1]

Example 2

Synthesis of mixed 2-aminoethylethanolamine and t-butylamine hexahydrotriazine (2AEE/tBu-TRz)

Water and formaldehyde (18.5 g, 0.62 moles) were added to a reaction flask which was then cooled with an ice bath. This material can be synthesized in three ways. The desired product was then synthesized by three different procedures:

(a) the addition of 2-aminoethylethanolamine (33.6 g, 0.323 moles) and t-butylamine (23.6 g, 0.323 moles);

(b) the sequential addition of 2-aminoethylethanolamine (33.6 g, 0.323 moles) followed by the addition of t-butylamine (23.6 g, 0.323 moles); and (c) the sequential addition of t-butylamine (23.6 g, 0.323 moles) followed by the addition of 2-aminoethylethanolamine (33.6 g, 0.323 moles).

In procedure (b) and (c), a mild exotherm was observed during the addition of the t-butylamine and a much stronger exotherm was observed during the addition of 2-aminoethylethanolamine. By following (a), (b) and (c), a totally homogenous solution of was obtained containing products (I), (II), (III) and (IV) set forth below. Each of (a), (b) and (c) rendered the same hydrogen sulfide scavenger performance within experimental error.

I

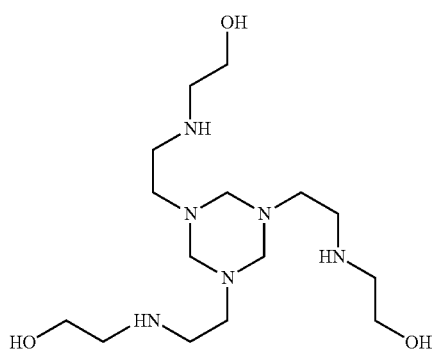

II

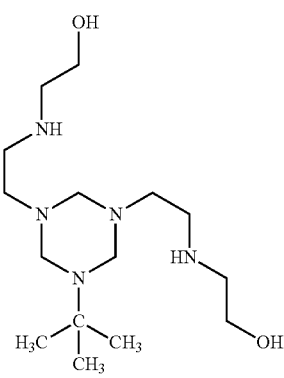

III

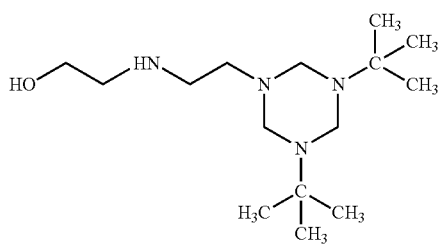

IV

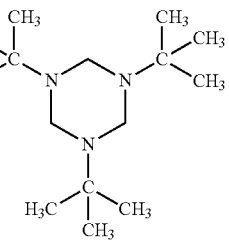

Example 3

The compound of formula (IV) was prepared by slowly adding 2.1 moles (154.6 g)) of t-butyl amine into 2.0 moles of formaldehyde as 165.3 g of 37% formalin solution with continuous stirring. The preparation was carried out in a round bottom reaction flask equipped with an additional funnel, a magnetic stirrer, and a cooling bath. The t-butyl amine was added at such a rate that the temperature did not exceed 42° C. The reaction mixture was allowed to cool and was transferred to a reparatory funnel. The lower aqueous phase was drained off and the top organic phase was separated and dried with anhydrous reagent magnesium sulfate and the product collected by filtration. This material was then dried a second time with anhydrous magnesium sulfate. NMR analysis confirmed the product to that of formula (IV). See, U.S. Pat. No. 5,674,377, herein incorporated by reference.

The product of formula (IV) was then mixed in a beaker at equal molar proportions with the compound of formula (I) [prepared as set forth in Example 2(a) above]. A heterogeneous fluid was obtained as the product of formula (IV) was not soluble in water. This compound floated to the top of the beaker. This is in contrast to the homogeneous solution that was illustrated in Example 2. The fact that the synthesis of Example 2 yielded a homogenous fluid is evidence of the existence of both the formation of compound (II) and compound (III), i.e., intramolecular mixed species.

Comparative Example 4

Synthesis of mixed 1,3,5-trimethylhexahydro-s-triazine and 1,3,5-tris(2-hydroxyethyl)hexahydro-s-triazine (MMA-TRz/MEA-TRz)

The triazine was prepared by adding water and formaldehyde (18.5 g, 0.62 moles) to a reaction flask which was then cooled with an ice bath. Methylamine and water were added dropwise (10.0 g, 0.32 moles) followed by ethanolamine (19.7 g, 0.32 moles) and the temperature was controlled to not exceed 50° C. The reaction was stirred for an additional 3 hours. A homogenous solution was obtained consisting of the following:

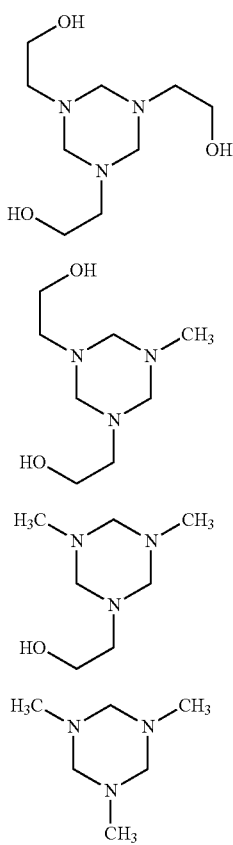

The product was also prepared by the single mix process (using the same concentrations in accordance with the procedure of Example 2(a) above. No difference was noted in the products obtained.

Example 5

The scavengers in Examples 1, 2 and 4 above were synthesized and then formulated in water and methanol as follows. A 100 g fluid was prepared containing 22 g active scavenger, 5 g methanol and the balance water by adding the scavenger to the methanol and water. (The exact amount of water added is dependent on the activity of the scavenger concentrate generated from the synthesis described in the above Examples.) An aliquot of the scavenger formulation (1 ml) was then dissolved in water (400 mls); the concentration varying from between approximately 300 and 1000 micro molar ($10^{-6}$ moles per liter) depending on the molecular weight of the scavenger. This scavenger solution was placed in a tall thin gas tower fitted with an inlet tube and a glass sinter frit at its base. A gas mixture of 3000 ppm hydrogen sulfide in nitrogen was passed through this solution and the effluent gas was periodically sample with a gas syringe. A 10 microliter aliquot of gas was then injected onto a gas chromatograph fitted with a sulfur specific flame photometric detector to observe the presence or otherwise of hydrogen sulfide. The hydrogen sulfide content was observed and is presented as the Sulfur Specific Flame Photometric Detector (S-SPD) detector response in picoamps sec vs. time in FIG. 1. FIG. 1 demonstrates that the 2AEE plus tBu-amine derived triazine has essentially the same performance as the MEA plus MMA amine derived triazine when made by either the mixed or sequential method when using half the molar concentration of the latter. It also shows that 2AEE plus tBu amine derived triazine is approximately three times more effective than the 2AEE triazine by itself.

From the foregoing, it will be observed that numerous variations and modifications may be effected without departing from the true spirit and scope of the novel concepts of the invention.

What is claimed is:

1. A method for scavenging hydrogen sulfide and/or mercaptans from a liquid or gaseous stream which comprises bringing the stream into contact with a scavenging effective amount of at least one triazine of the formula:

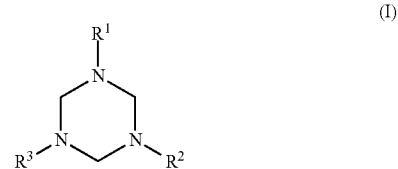

(I)

wherein $R^1$, $R^2$ and $R^3$ are each independently selected from the group consisting of $R^4$ and $R^5$, $R^4$ is a $C_1$-$C_{20}$ straight or branched chain alkyl group, $R^5$ is $-[(CH)_m-NH]_p-(CH_2)_nOH$, n and m are independently an integer from 2 to about 6, p is from 1 to about 6; and further wherein at least one of $R^1$, $R^2$ and $R^3$ is $R^4$ and at least one of $R^1$, $R^2$ and $R^3$ is $R^5$.

2. The method of claim 1, wherein $R^5$ is $-CH_2CH_2NHCH_2CH_2OH$.

3. The method of claim 1, wherein $R^4$ is a $C_1$-$C_6$ straight or branched chain alkyl group.

4. The method of claim 3, wherein $R^4$ is t-butyl.

5. The method of claim 1, wherein two of $R^1$, $R^2$ and $R^3$ are $R^5$ and one of $R^1$, $R^2$ and $R^3$ is $R^4$.

6. The method of claim 1, wherein the triazine is a mixture of:
(i) a first triazine of formula (I) wherein $R^1$ and $R^2$ are $R^4$ and $R^3$ is $R^5$;
(ii) a second triazine of formula (I) wherein $R^1$ is $R^4$ and $R^2$ and $R^3$ are $R^5$;
(iii) a third triazine of formula (I) wherein $R^1$, $R^2$ and $R^3$ are $R^4$; and
(iv) a fourth triazine of formula (I) wherein $R^1$, $R^2$ and $R^3$ are $R^5$ and further wherein the substituent for $R^4$ for each of the triazines of (i), (ii), (iii) and (iv) is the same and the substituent for $R^5$ for each of the triazines of (i), (ii), (iii) and (iv) is the same.

7. The method of claim 6, wherein each $R^4$ of the triazines of (i), (ii), (iii) and (iv) is a $C_1$-$C_6$ alkyl group.

8. The method of claim 7, wherein the $C_1$-$C_6$ alkyl group is t-butyl.

9. The method of claim 6, wherein each $R^5$ of the triazines of (i), (ii), (iii) and (iv) is —$CH_2CH_2NHCH_2CH_2OH$.

10. The method of claim 9, wherein each $R^4$ of the triazines of (i), (ii), (iii) is t-butyl.

11. The method of claim 1, wherein p is 2.

12. A method for reducing an amount of sulfhydryl compounds in a hydrocarbon substrate, comprising mixing the hydrocarbon substrate with a scavenging effective amount of a triazine of the formula:

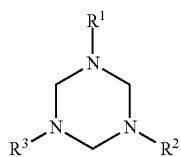

(I)

wherein $R^1$, $R^2$ and $R^3$ are each independently selected from the group consisting of $R^4$ and $R^5$, $R^4$ is a $C_1$-$C_{20}$ straight or branched chain alkyl group, $R^5$ is —$[(CH)_m—NH]_p—(CH_2)_nOH$, n and m are independently an integer from 2 to about 6, p is from 1 to about 6; and further wherein at least one of $R^1$, $R^2$ and $R^3$ is $R^4$ and at least one of $R^1$, $R^2$ and $R^3$ is $R^5$.

13. The method of claim 12, wherein $R^5$ is —$CH_2CH_2NHCH_2CH_2OH$.

14. The method of claim 12, wherein $R^4$ is a $C_1$-$C_6$ straight or branched chain alkyl group.

15. The method of claim 14, wherein $R^4$ is t-butyl.

16. The method of claim 12, wherein $R^4$ is t-butyl.

17. The method of claim 12, wherein the hydrocarbon substrate is a wet or dry gaseous mixture of hydrogen sulfide and/or mercaptan and hydrocarbon vapors.

18. The method of claim 17, wherein the hydrocarbon substrate is a sour aqueous or sour hydrocarbon substrate.

19. The method of claim 18, wherein the triazine is a mixture of:
(i) a first triazine of formula (I) wherein $R^1$ and $R^2$ are $R^4$ and $R^3$ is $R^5$;
(ii) a second triazine of formula (I) wherein $R^1$ is $R^4$ and $R^2$ and $R^3$ are $R^5$;
(iii) a third triazine of formula (I) wherein $R^1$, $R^2$ and $R^3$ are $R^4$; and
(iv) a fourth triazine of formula (I) wherein $R^1$, $R^2$ and $R^3$ are $R^5$ and further wherein the substituent for $R^4$ for each of the triazines of (i), (ii), (iii) and (iv) is the same and the substituent for $R^5$ for each of the triazines of (i), (ii), (iii) and (iv) is the same.

20. The method of claim 19, wherein each $R^5$ in the first triazine, second triazine, and fourth triazine is —$CH_2CH_2NHCH_2CH_2OH$ and each $R^4$ in the first triazine, second triazine, and third triazine is t-butyl.

* * * * *